(12) United States Patent
Yoshimura et al.

(10) Patent No.: US 7,192,674 B2
(45) Date of Patent: *Mar. 20, 2007

(54) LITHIUM PRIMARY BATTERY

(75) Inventors: Seiji Yoshimura, Kobe (JP); Takashi Okamoto, Ooizumi-machi (JP); Maruo Kamino, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 383 days.

This patent is subject to a terminal disclaimer.

(21) Appl. No.: 10/349,952

(22) Filed: Jan. 24, 2003

(65) Prior Publication Data

US 2003/0138700 A1    Jul. 24, 2003

(30) Foreign Application Priority Data

Jan. 24, 2002    (JP)    ............................. 2002-015034

(51) Int. Cl.
*H01M 4/58*    (2006.01)
*H01M 4/50*    (2006.01)
*H01M 4/40*    (2006.01)

(52) U.S. Cl. ............... 429/231.95; 429/224; 429/218.1

(58) Field of Classification Search ........... 429/231.95, 429/224, 218.1
See application file for complete search history.

(56) References Cited

U.S. PATENT DOCUMENTS 5,114,811 A * 5/1992 Ebel et al. ................. 429/337

| 5,705,296 A | 1/1998 | Kamauchi et al. ........... 429/218 |
| 6,391,492 B1 | 5/2002 | Kawakami et al. ......... 429/209 |
| 2002/0172864 A1* | 11/2002 | Yoshimura et al. ......... 429/224 |

FOREIGN PATENT DOCUMENTS

| JP | 02-256163 A | 10/1990 |
| JP | 2-256163 A | 10/1990 |
| JP | 11-339794 A | 12/1999 |
| JP | 2001-52698 | * 2/2001 |
| JP | 2001-180939 A | 7/2001 |
| JP | 2002-308627 A | 10/2002 |

OTHER PUBLICATIONS

D. Linden, Handbook of Batteries, 1995, McGraw-Hill, Inc., 2nd Ed., Table 36.11.*

* cited by examiner

*Primary Examiner*—Patrick Joseph Ryan
*Assistant Examiner*—Angela J. Martin
(74) *Attorney, Agent, or Firm*—Kubovcik & Kubovcik

(57) ABSTRACT

A lithium primary battery contains a positive electrode and a negative electrode, wherein the positive electrode comprises manganese dioxide containing boron and phosphorus and the negative electrode comprises lithium or lithium alloy.

12 Claims, 1 Drawing Sheet

LITHIUM PRIMARY BATTERY

FIELD OF THE INVENTION

The present invention relates to a lithium primary battery, specifically, a lithium primary battery in which manganese dioxide is used for a positive electrode.

BACKGROUND OF THE INVENTION

A lithium primary battery has excellent characteristics such as very high electromotive force, and is used for various purposes which utilize this characteristic. Especially, a lithium primary battery using manganese dioxide for a positive electrode is applied for many purposes, for example, for a camera, memory back-up, meter device, and the like, because it has excellent high rate discharge characteristics and discharge characteristics at a low temperature.

Addition of boron to manganese dioxide has been proposed for inhibiting an increase of internal resistance of a battery as a discharge reaction progress in Japanese Patent Laid-open publication No. 11-339794. It has also been proposed to use manganese dioxide obtained by electrolytic oxidation by performing electrolysis in an electrolyte bath containing phosphoric acid in Japanese Patent Laid-open publication No. 2-256163.

However, use of a lithium primary battery has been expanded and there are requests for further improved storage characteristics especially in a use of the battery for memory back-up, meter device, and the like. Manganese dioxide free of impurities and manganese dioxide including boron or phosphorous as described in the above mentioned Japanese Patent Laid-open publications have been used. However, there is a problem that the battery does not have sufficient storage characteristics because manganese dioxide is dissolved in an electrolyte during storage and the dissolved manganese dioxide deposits on a negative electrode.

OBJECT OF THE INVENTION

An object of the present invention is to provide a lithium primary battery having manganese dioxide for a positive electrode and having improved storage characteristics.

SUMMARY OF THE INVENTION

The present invention is characterized in that a lithium primary battery having a positive electrode and a negative electrode comprising lithium or lithium alloy in which the positive electrode comprises manganese dioxide containing boron and phosphorus.

EXPLANATION OF ELEMENTS

Figure 1:
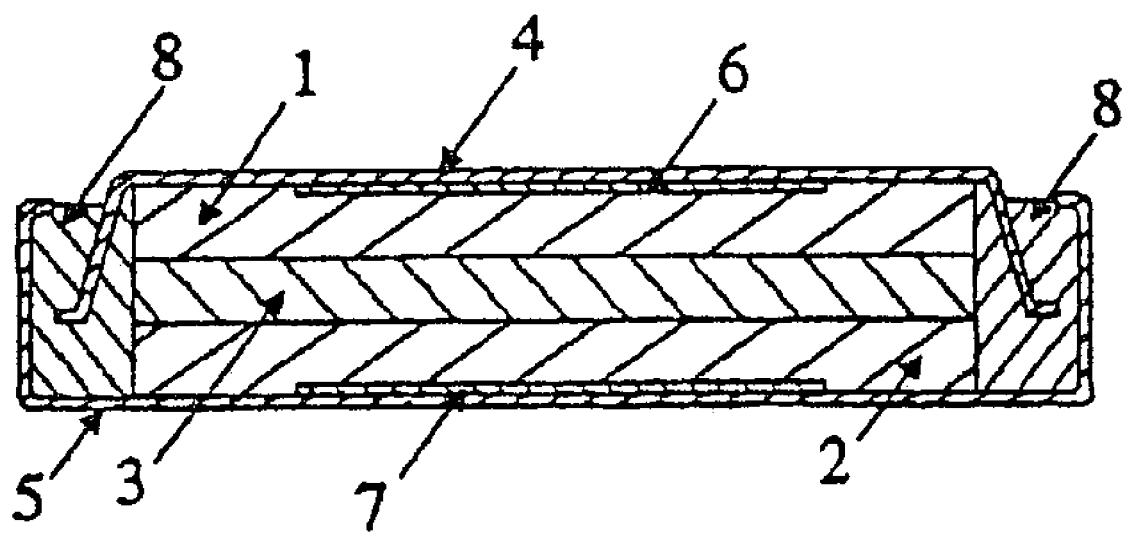
FIG. 1 is a cross section of a lithium primary battery of the present invention prepared in the Examples and Comparative Examples.

1: negative electrode
2: positive electrode
3: separator
4: negative electrode can
5: positive electrode can
6: negative electrode current collector
7: positive electrode current collector
8: insulation packing

DETAILED EXPLANATION OF THE INVENTION

In the present invention, manganese dioxide containing boron and phosphorous is used for a positive electrode. Manganese dioxide including both boron and phosphate makes it possible to improve storage characteristics as compared with manganese dioxide including only one of boron and phosphorous. This is because a compound oxide of manganese-boron-phosphorous is produced on the surface of the manganese dioxide with boron and phosphorous to inhibit dissolution of manganese dioxide into an electrolyte.

It is preferable to include boron and phosphorous in the manganese dioxide in a range of 0.05 to 5 weight % of boron and in a range of 0.01 to 5 weight % of phosphorous and, further preferably in a range of 0.1 to 2 weight % of boron and in a range of 0.02 to 2 weight % of phosphorous. When boron and phosphorous within these ranges are used, storage characteristics of a battery can be further improved.

There is no limitation with respect to a method to have boron included in the manganese dioxide. It is illustrated that a powdered boron compound can be added to a powdered manganese dioxide as a method. Boric oxide, boric acid, metaboric acid and hypoboric acid (tetraboric acid) are illustrated as the boron compound. If a borate is used, lithium salt is preferable. Boric oxide is most preferable among the above mentioned boron compounds.

There is also no limitation with respect to a method to have phosphorous included in the manganese dioxide. If phosphoric acid is used as a phosphorus compound, it is preferable to prepare manganese dioxide containing phosphorous that is obtained by performing electrolysis (electrolytic oxidation) in an electrolytic bath containing phosphoric acid. Concretely, a method disclosed in Japanese Patent Laid-open No. 2-256163 can be used. If phosphate, for example, lithium phosphate, and the like, phosphorous acid or phosphate is used as a phosphorus compound, it is possible to obtain manganese dioxide containing phosphorous by adding and mixing such compound to manganese dioxide. Lithium salt is most preferable as a phosphate, but potassium salt or other salt also can be used.

A negative electrode for the present invention is an electrode containing lithium or lithium alloy. Lithium alloy containing aluminum is preferably used. An amount of aluminum contained in the alloy is preferably in a range of 0.05 to 2 weight %.

An electrolyte to be used for the present invention is not limited and any electrolyte which can be used for a lithium primary battery can be used for the present invention. As a solute, lithium salt is generally used, and lithium salt containing fluorine is especially preferred.

DESCRIPTION OF PREFERRED EMBODIMENT

Examples of the present invention are described below. It is of course understood, however, that the present invention can be modified within the scope and spirit of the appended claims.

EXAMPLE 1

EXAMPLE 1-1

[Preparation of Positive Electrode]

0.01 mol/l phosphoric acid ($H_3PO_4$) was added to an electrolytic bath containing 1 mol/l sulfuric acid. Manganese dioxide was prepared by using the electrolytic bath by electrolytic oxidation. Obtained manganese dioxide was ground to make powder. When the manganese dioxide powder was analyzed by ICP, the manganese dioxide contained 0.1 weight % of phosphorous. Boric oxide ($B_2O_3$) was added to the manganese dioxide powder to contain 0.5 weight % of boron, and the mixture was treated at 375° C. for 24 hours in air (baking) to obtain manganese dioxide containing boron and phosphorous as a positive electrode active material.

The manganese dioxide powder containing boron and phosphorous, carbon black powder as a conductive agent and fluorine-containing resin as a binding agent were mixed in a ratio of 85:10:5 by weight to prepare a positive electrode material. The positive electrode material was molded into a disk and was dried in a vacuum at 250° C. for two hours to prepare a positive electrode.

[Preparation of Negative Electrode]

Lithium alloy containing 0.5 weight % of aluminum (Li—Al) was cut as a sheet to prepare a negative electrode.

[Preparation of Non-aqueous Electrolyte]

1 mol/l lithium trifluoromethanesulfonate ($LiCF_3SO_3$) as a solute was dissolved in a mixed solvent of ethylene carbonate (PC) and 1,2-dimethoxyethane (DME) at a ratio of 50:50 by volume to prepare a non-aqueous electrolyte.

[Assembly of Battery]

A coin shaped battery A1 (lithium primary battery; battery size: outer diameter 24 mm, thickness 3 mm) of the present invention was assembled using the positive electrode, negative electrode and non-aqueous electrolyte prepared above. A porous film comprising polypropylene was used as a separator and was impregnated with the non-aqueous electrolyte.

FIG. 1 is a cross section of the assembled battery of the present invention. Battery A1 of the present invention comprises negative electrode 1, positive electrode 2, separator 3 for separating electrodes 1 and 2 from each other, negative electrode can 4, positive electrode can 5, negative electrode current collector 6 [stainless steel sheet (SUS304)], positive electrode current collector 7 [stainless steel sheet (SUS316)] and insulation packing 8.

The negative electrode 1 and positive electrode 2 were made to face each other through the separator 3 and were placed in a battery case comprising the negative electrode can 4 and positive electrode can 5. The positive electrode 2 was connected to the positive electrode can 5 through the positive electrode current collector 7, and the negative electrode 1 was connected to the negative electrode can 4 through the negative electrode current collector 6 to take chemical energy created inside the battery out as electrical energy from both terminals of the positive electrode can 5 and the negative electrode can 4. Internal electrical resistance of the battery was about 15 Ω soon after the battery was assembled (all of the batteries of the following examples and comparative examples also have an internal electrical resistance of the battery of about 15 Ω soon after the batteries were assembled)

[Measurement of Capacity Maintenance Rate (Storage Characteristic)]

Each battery soon after being assembled was discharged to 2V at a current of 10 mA at 25° C. to measure a charge capacity before storage. Discharge capacity of all batteries in the Examples, including this example, and the Comparative Examples was 100 mAh. After each battery was stored at 90° C. for one month, each battery was discharged to 2 V at a current of 10 mA at 25° C. to measure a discharge capacity after storage. Self discharge rate was calculated as follows:

Self discharge rate (%)={{discharge capacity after storage/discharge capacity before storage)}×100

In the following Examples and Comparative Examples, except for Example 4, phosphorous was added to manganese dioxide by adding phosphoric acid to an electrolyte bath for preparation of manganese dioxide in the same manner as Example 1-1. An amount of phosphoric acid added to the electrolyte bath was adjusted to provide a desired amount of phosphorous in the manganese dioxide.

EXAMPLE 1-2

A battery A2 of the present invention was assembled in the same manner as Example 1-1 except that boric oxide and phosphoric acid were used to provide 0.5 weight % of boron and 0.01 weight % of phosphorous in the manganese dioxide.

EXAMPLE 1-3

A battery A3 of the present invention was assembled in the same manner as Example 1-1 except that boric oxide and phosphoric acid were used to provide 0.5 weight % of boron and 0.02 weight % of phosphorous in the manganese dioxide.

EXAMPLE 1-4

A battery A4 of the present invention was assembled in the same manner as Example 1-1 except that boric oxide and phosphoric acid were used to provide 0.5 weight % of boron and 0.05 weight % of phosphorous in the manganese dioxide.

EXAMPLE 1-5

A battery A5 of the present invention was assembled in the same manner as Example 1-1 except that boric oxide and phosphoric acid were used to provide 0.5 weight % of boron and 0.5 weight % of phosphorous in the manganese dioxide.

EXAMPLE 1-6

A battery A6 of the present invention was assembled in the same manner as Example 1-1 except that boric oxide and phosphoric acid were used to provide 0.5 weight % of boron and 1 weight % of phosphorous in the manganese dioxide.

EXAMPLE 1-7

A battery A7 of the present invention was assembled in the same manner as Example 1-1 except that boric oxide and phosphoric acid were used to provide 0.5 weight % of boron and 2 weight % of phosphorous in the manganese dioxide.

EXAMPLE 1-8

A battery A8 of the present invention was assembled in the same manner as Example 1-1 except that boric oxide and phosphoric acid were used to provide 0.5 weight % of boron and 5 weight % of phosphorous in the manganese dioxide.

Comparative Example 1-1

A comparative battery X1 was assembled in the same manner as Example 1-1 except that manganese dioxide free from (not containing) boron and phosphorous was used to prepare a positive electrode.

Comparative Example 1-2

A comparative battery X2 was assembled in the same manner as Example 1-1 except that manganese dioxide free from (not containing) phosphorous was used to prepare a positive electrode.

TABLE 1

| Battery | Positive Electrode (weight %) | | Negative Electrode (weight %) | Self Discharge Rate (%) |
|---|---|---|---|---|
| | B | P | Al | |
| X1 (Comparative) | 0 | 0 | 0.5 | 22 |
| X2 (Comparative) | 0.5 | 0 | 0.5 | 23 |
| A2 | 0.5 | 0.01 | 0.5 | 19 |
| A3 | 0.5 | 0.02 | 0.5 | 14 |
| A4 | 0.5 | 0.05 | 0.5 | 12 |
| A1 | 0.5 | 0.1 | 0.5 | 9 |
| A5 | 0.5 | 0.5 | 0.5 | 12 |
| A6 | 0.5 | 1 | 0.5 | 13 |
| A7 | 0.5 | 2 | 0.5 | 14 |
| A8 | 0.5 | 5 | 0.5 | 18 |

The results shown in Table 1 illustrate that using manganese dioxide containing phosphorous and boron improves storage characteristics. When an amount of phosphorous content was in a range of 0.02 to 2 weight %, storage characteristics were especially improved.

EXAMPLE 2

EXAMPLE 2-1

A battery B1 of the present invention was assembled in the same manner as Example 1-1 except that boric oxide and phosphoric acid were used to provide 0.05 weight % of boron and 0.1 weight % of phosphorous in the manganese dioxide.

EXAMPLE 2-2

A battery B2 of the present invention was assembled in the same manner as Example 1-1 except that boric oxide and phosphoric acid were used to provide 0.1 weight % of boron and 0.1 weight % of phosphorous in the manganese dioxide.

EXAMPLE 2-3

A battery B3 of the present invention was assembled in the same manner as Example 1-1 except that boric oxide and phosphoric acid were used to provide 1 weight % of boron and 0.1 weight % of phosphorous in the manganese dioxide.

EXAMPLE 2-4

A battery B4 of the present invention was assembled in the same manner as Example 1-1 except that boric oxide and phosphoric acid were used to provide 2 weight % of boron and 0.1 weight % of phosphorous in the manganese dioxide.

EXAMPLE 2-5

A battery B5 of the present invention was assembled in the same manner as Example 1-1 except that boric oxide and phosphoric acid were used to provide 5 weight % of boron and 0.1 weight % of phosphorous in the manganese dioxide.

Comparative Example 2-1

A comparative battery Y1 was assembled in the same manner as Example 1-1 except that manganese dioxide free from (not containing) boron was used to prepare a positive electrode.

TABLE 2

| Battery | Positive Electrode (weight %) | | Negative Electrode (weight %) | Self Discharge Rate (%) |
|---|---|---|---|---|
| | B | P | Al | |
| Y1 (Comparative) | 0 | 0.1 | 0.5 | 23 |
| B1 | 0.05 | 0.1 | 0.5 | 18 |
| B2 | 0.1 | 0.1 | 0.5 | 14 |
| A1 | 0.5 | 0.1 | 0.5 | 9 |
| B3 | 1 | 0.1 | 0.5 | 12 |
| B4 | 2 | 0.1 | 0.5 | 14 |
| B5 | 5 | 0.1 | 0.5 | 19 |

The results shown in Table 2 shows that using manganese dioxide containing phosphorous and boron improves storage characteristics. When an amount of boron content was in a range of 0.1 to 2 weight %, storage characteristics were especially improved.

EXAMPLE 3

EXAMPLE 3-1

A battery C1 of the present invention was assembled in the same manner as Example 1-1 except that boric acid ($H_3BO_3$) and phosphoric acid were used to provide 0.5 weight % of boron and 0.1 weight % of phosphorous in the manganese dioxide.

EXAMPLE 3-2

A battery C2 of the present invention was assembled in the same manner as Example 1-1 except that metaboric acid ($HBO_2$) and phosphoric acid were used to provide 0.5 weight % of boron and 0.1 weight % of phosphorous in the manganese dioxide.

EXAMPLE 3-3

A battery C3 of the present invention was assembled in the same manner as Example 1-1 except that hypoboric acid ($H_4B_2O_4$) and phosphoric acid were used to provide 0.5 weight % of boron and 0.1 weight % of phosphorous in the manganese dioxide.

EXAMPLE 3-4

A battery C4 of the present invention was assembled in the same manner as Example 1-1 except that lithium metaborate ($LiBO_2$) and phosphoric acid were used to provide 0.5 weight % of boron and 0.1 weight % of phosphorous in the manganese dioxide.

TABLE 3

| Battery | Positive Electrode (weight %) | | Negative Electrode (weight %) | Self Discharge Rate (%) |
|---|---|---|---|---|
| | B | P | Al | |
| A1 | 0.5 ($B_2O_3$) | 0.1 | 0.5 | 9 |
| C1 | 0.5 ($H_3BO_3$) | 0.1 | 0.5 | 12 |
| C2 | 0.5 ($HBO_2$) | 0.1 | 0.5 | 14 |
| C3 | 0.5 ($H_4B_2O_4$) | 0.1 | 0.5 | 13 |
| C4 | 0.5 ($LiBO_2$) | 0.1 | 0.5 | 12 |

As shown in Table 3, boric oxide is most suitable as a boron compound to be added to manganese dioxide.

EXAMPLE 4

A phosphorous compound was added to and was mixed with manganese dioxide as well as boric oxide to obtain manganese dioxide contained phosphorous and boron.

EXAMPLE 4-1

A battery D1 of the present invention was assembled in the same manner as Example 1-1 except that boric oxide ($B_2O_3$) and lithium phosphate ($Li_3PO_4$) were used to provide 0.5 weight % of boron and 0.1 weight % of phosphorous in the manganese dioxide.

EXAMPLE 4-2

A battery D2 of the present invention was assembled in the same manner as Example 1-1 except that boric oxide ($B_2O_3$) and dipotassium hydrogenphosphate ($K_2HPO_3$) were used to provide 0.5 weight % of boron and 0.1 weight % of phosphorous in the manganese dioxide.

EXAMPLE 4-3

A battery D3 of the present invention was assembled in the same manner as Example 1-1 except that boric oxide ($B_2O_3$) and phosphorous acid ($H_2PHO_3$) were used to provide 0.5 weight % of boron and 0.1 weight % of phosphorous in the manganese dioxide.

TABLE 4

| Battery | Positive Electrode (weight %) | | Negative Electrode (weight %) | Self Discharge Rate (%) |
|---|---|---|---|---|
| | B | P | Al | |
| A1 | 0.5 | 0.1 ($H_3PO_4$) | 0.5 | 9 |
| D1 | 0.5 | 0.1 ($Li_3PO_4$) | 0.5 | 10 |
| D2 | 0.5 | 0.1 ($K_2HPO_4$) | 0.5 | 14 |
| D3 | 0.5 | 0.1 ($H_2PHO_3$) | 0.5 | 13 |

It is understood from the results shown in Table 4 that addition of phosphoric acid in an electrolyte bath is the most suitable method to obtain manganese dioxide containing phosphorous.

EXAMPLE 5

EXAMPLE 5-1

A battery E1 of the present invention was assembled in the same manner as Example 1-1 except that lithium metal which does not include aluminum was used for a negative electrode.

EXAMPLE 5-2

A battery E2 of the present invention was assembled in the same manner as Example 1-1 except that lithium alloy containing 0.02 weight % of aluminum (Li—Al) was used for a negative electrode.

EXAMPLE 5-3

A battery E3 of the present invention was assembled in the same manner as Example 1-1 except that lithium alloy containing 0.05 weight % of aluminum (Li—Al) was used for a negative electrode.

EXAMPLE 5-4

A battery E4 of the present invention was assembled in the same manner as Example 1-1 except that lithium alloy containing 0.1 weight % of aluminum (Li—Al) was used for a negative electrode.

EXAMPLE 5-5

A battery E5 of the present invention was assembled in the same manner as Example 1-1 except that lithium alloy containing 1 weight % of aluminum (Li—Al) was used for a negative electrode.

EXAMPLE 5-6

A battery E6 of the present invention was assembled in the same manner as Example 1-1 except that lithium alloy containing 2 weight % of aluminum (Li—Al) was used for a negative electrode.

EXAMPLE 5-7

A battery E7 of the present invention was assembled in the same manner as Example 1-1 except that lithium alloy containing 5 weight % of aluminum (Li—Al) was used for a negative electrode.

TABLE 5

| Battery | Positive Electrode (weight %) | | Negative Electrode (weight %) | Self Discharge Rate (%) |
|---|---|---|---|---|
| | B | P | Al | |
| E1 | 0.5 | 0.1 | 0 | 19 |
| E2 | 0.5 | 0.1 | 0.02 | 18 |
| E3 | 0.5 | 0.1 | 0.05 | 14 |
| E4 | 0.5 | 0.1 | 0.1 | 9 |
| A1 | 0.5 | 0.1 | 0.5 | 9 |
| E5 | 0.5 | 0.1 | 1 | 9 |
| E6 | 0.5 | 0.1 | 2 | 14 |
| E7 | 0.5 | 0.1 | 5 | 19 |

It is understood from the results shown in Table 5 that lithium alloy containing aluminum in a range of 0.05 to 2 weight % is preferred as a negative electrode material. It is believed that if the content of aluminum in a lithium alloy is small, a sufficient effect to inhibit deposition of manganese on the surface of a negative electrode cannot be obtained. If the content of aluminum in a lithium alloy is too great, storage characteristics of a negative electrode itself are deteriorated.

ADVANTAGES OF THE INVENTION

The present invention remarkably improves storage characteristics of a lithium primary battery.

What is claimed is:

1. A lithium primary battery comprising a positive electrode and a negative electrode, wherein the positive electrode consists essentially of manganese dioxide, boron, phosphorus and carbon and does not contain lithium prior to discharge and the negative electrode comprises a lithium alloy containing 0.05 to 2 weight % of aluminum.

2. The lithium primary battery according to claim 1, wherein said manganese dioxide contains 0.05 to 5 weight % of boron and 0.01 to 5 weight % of phosphorous.

3. The lithium primary battery according to claim 1, wherein said manganese dioxide contains 0.1 to 2 weight % of boron and 0.02 to 2 weight % of phosphorous.

4. The lithium primary battery according to claim 1, wherein said boron is added to said manganese dioxide using boric oxide.

5. The lithium primary battery according to claim 2, wherein said boron is added to said manganese dioxide using boric oxide.

6. The lithium primary battery according to claim 3, wherein said boron is added to said manganese dioxide using boric oxide.

7. The lithium primary battery according to claim 1, wherein said phosphorous is added to said manganese dioxide by preparation of said manganese dioxide by electrolytic oxidation from an electrolyte bath containing phosphoric acid.

8. The lithium primary battery according to claim 2, wherein said phosphorous is added to said manganese dioxide by preparation of said manganese dioxide by electrolytic oxidation from an electrolyte bath containing phosphoric acid.

9. The lithium primary battery according to claim 3, wherein said phosphorous is added to said manganese dioxide by preparation of said manganese dioxide by electrolytic oxidation from an electrolyte bath containing phosphoric acid.

10. The lithium primary battery according to claim 4, wherein said phosphorous is added to said manganese dioxide by preparation of said manganese dioxide by electrolytic oxidation from an electrolyte bath containing phosphoric acid.

11. The lithium primary battery according to claim 5, wherein said phosphorous is added to said manganese dioxide by preparation of said manganese dioxide by electrolytic oxidation from an electrolyte bath containing phosphoric acid.

12. The lithium primary battery according to claim 6, wherein said phosphorous is added to said manganese dioxide by preparation of said manganese dioxide by electrolytic oxidation from an electrolyte bath containing phosphoric acid.

* * * * *